United States Patent [19]

Kraeling, Jr. et al.

[11] 4,328,103
[45] May 4, 1982

[54] STRUCTURAL STRAINER

[75] Inventors: John B. Kraeling, Jr.; Alexander B. Mann; Ronald G. Bukowski, all of Erie, Pa.

[73] Assignee: Zurn Industries, Inc., Erie, Pa.

[21] Appl. No.: 103,200

[22] Filed: Dec. 13, 1979

[51] Int. Cl.³ ............................................. B01D 29/06
[52] U.S. Cl. .................................... 210/411; 210/413; 210/454; 210/497.01
[58] Field of Search ............... 210/407, 409, 411, 413, 210/414, 494 R, 497 R, 499, 493.2, 454

[56] References Cited

U.S. PATENT DOCUMENTS

| | | | |
|---|---|---|---|
| 1,053,131 | 2/1913 | Overly | 210/414 |
| 2,066,479 | 1/1937 | MacIsaac | 210/414 |
| 2,593,293 | 4/1952 | Giaque | 210/493.2 |
| 3,256,995 | 6/1966 | Schmid et al. | 210/411 |

Primary Examiner—Ivars C. Cintins
Attorney, Agent, or Firm—Webb, Burden, Robinson & Webb

[57] ABSTRACT

A strainer is provided for removing particulate debris from a fluid passing therethrough. The strainer is primarily of the automatic type having a hollow body, a cover, a strainer element and a backwash arm assembly for cleaning the strainer element. The strainer element is a cylindrical, convoluted screen having encapsulating end caps positioned at either end. The end caps and thus the strainer element are retained so as to avoid rotation in seal rings, one of which is connected to the cover and the other of which is detachably connected to the terminus of the backwash arm. The strainer element is a structural member capable of withstanding the loads imposed on it by the fluid.

6 Claims, 6 Drawing Figures

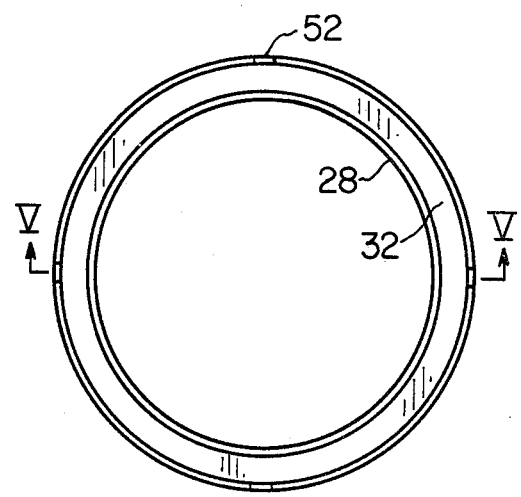
Fig.4
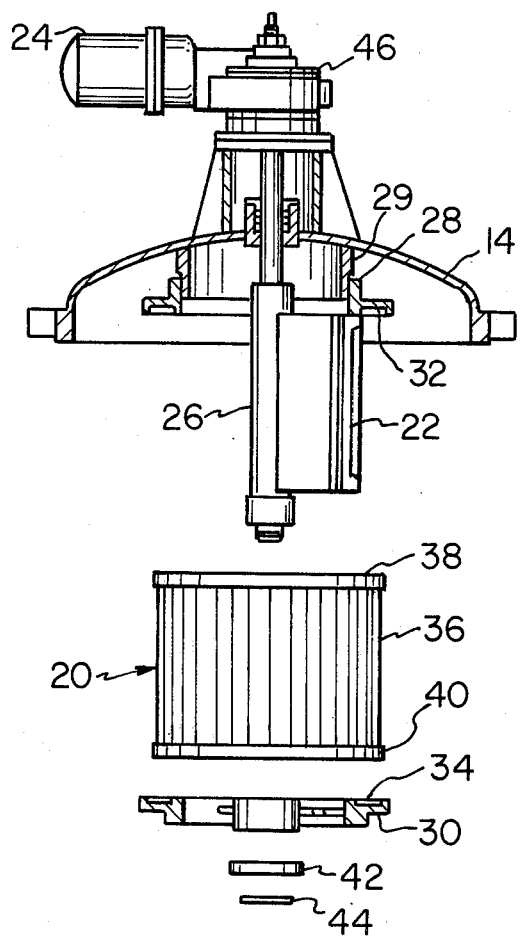
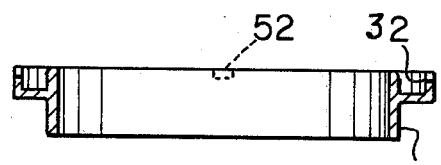
Fig.5
Fig.2
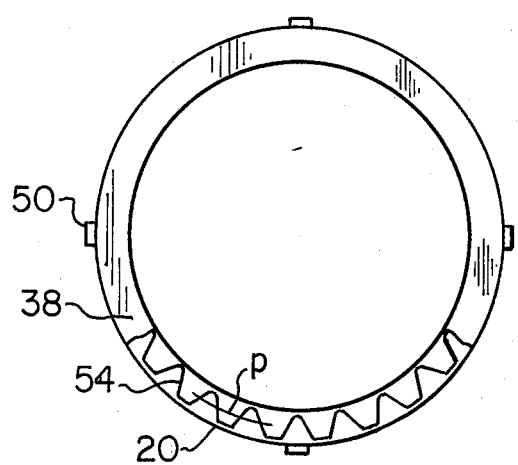
Fig.6

STRUCTURAL STRAINER

FIELD OF THE INVENTION

Our invention relates to strainers or filters and, more particularly, to strainers or filters of the automatic self-cleaning type.

DESCRIPTION OF THE PRIOR ART

Fluid strainers have been employed for many years in which accumulated solids or sedimentation from the fluid is collected on a screening media and thereafter removed from the screening media by means of a backwash shoe in which a portion of the fluid being strained or a different fluid from an external source is caused to flow in a reverse direction to clean the screening media. Typical applications include removing unwanted debris from water, wastewater and other fluid straining applications throughout industrial, utility, nuclear, petrochemical, commercial and municipal operations.

It has generally been accepted in the fluid handling industry that for most applications a strainer must have a safety factor of 3:1 in terms of the ratio of the area of the holes used for straining to the area of the input pipe. This then means that ⅔ of the straining area can be blinded before flow is interrupted. Because of this safety factor very large screens having substantial height to diameter ratios have been provided to give the requisite surface area of straining media.

Along with the need for sufficient surface area for screening is a strength requirement since the strainer element itself has load imposed upon it by the flow of fluid and particulate debris therethrough. This support is provided by external means such as a cage built around the screening element, see Schmid et al. U.S. Pat. No. 3,256,995. It is also known to provide a cylinder of substantial wall thickness having a plurality of openings therethrough to which are connected individual elements which do the screening.

Strainers are normally placed in line with the inlet and outlet because there simply is not room to otherwise accommodate a large screening media. However, placing the screening media in direct line with the inlet minimizes the use of the total surface area because the end areas of the screen receive less exposure to flow. In addition, by being directly in line, the screening media is subjected to substantial impact of debris under maximum velocity conditions.

It has been recognized that the surface area for straining can be increased by using a convoluted shape as taught by the Schmid et al. patent referred to hereinabove. However, the straining device of that patent extends for 270° only, is in direct line with the input flow and requires an external cage to support the screening media.

SUMMARY OF THE INVENTION

Our invention provides the necessary surface area for screening while minimizing the actual size of the screening media. Our invention further places the screening media out of direct line with the inlet flow so that there is no direct impingement of debris on the screening surface under maximum velocity conditions. In effect, the velocity is decreased at the time of the impact of the debris on the screen.

We have made our strainer element a structural element in and of itself without the need for external support. This is accomplished by using a convoluted screen extending 360° in the form of a cylinder. The convoluted screen is retained in end caps and the height to diameter ratio of the screen is generally less than one.

Our invention also provides for simple maintenance because of the unitized construction which allows the strainer element to be easily exposed and/or disassembled by merely removing the cover of the strainer.

Our strainer element is a convoluted screen in the form of a 360° cylinder in which the ends of the screen are encapsulated in end caps. Additional reinforcement in the form of bands or angles may be employed intermittent the end caps. The strainer element is positioned above the flow of the inlet and outlet into the strainer assembly and is retained between upper and lower seal rings. The upper seal ring is connected to the cover and the lower seal ring is detachably connected to the terminus of the backwash arm so that removal of the cover results in exposure of the entire screen. Mating tabs and slots are provided on the end caps and seal rings, respectively so as to prevent rotation of the strainer element.

DESCRIPTION OF THE DRAWINGS

FIG. 2 is an exploded view of the upper portion of the strainer assembly;

FIG. 4 is a plan view of the upper support ring;

FIG. 5 is a sectional view taken along lines V—V of FIG. 4;

FIG. 6 is a plan view partly cut away of the strainer element.

DESCRIPTION OF THE PREFERRED EMBODIMENTS

Figure 1:
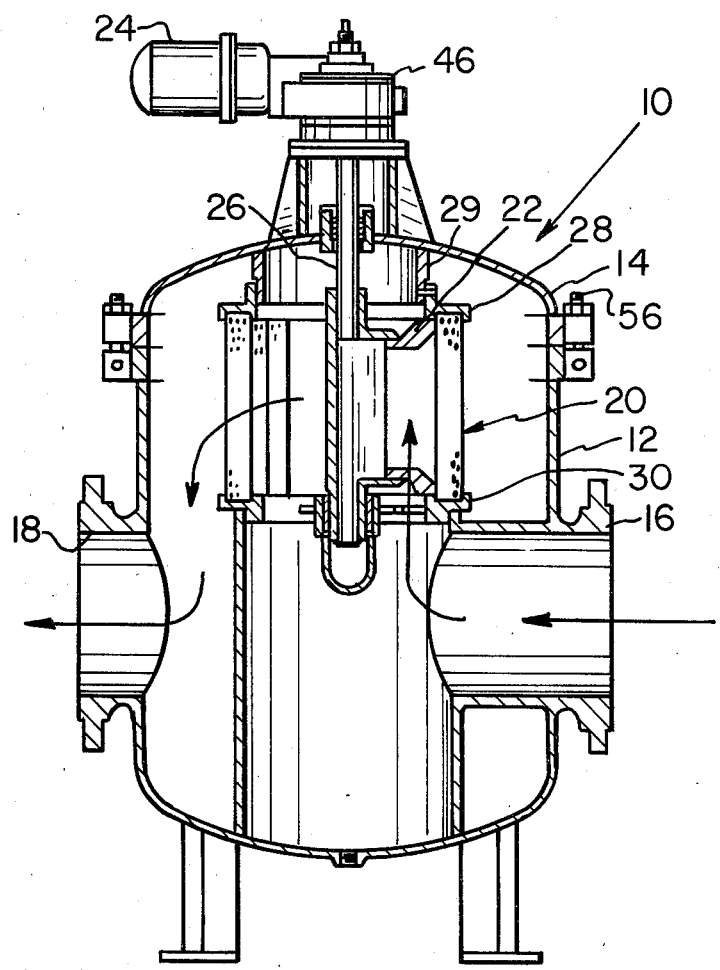
FIG. 1 is a sectional view through the entire strainer assembly.

The overall arrangement of our strainer, generally designated 10, is best seen in FIG. 1. The strainer 10 can be manufactured as either a casting or through fabrication. The body 12 of the strainer 10 is hollow and includes an inlet 16 and an outlet 18 on opposing sides of the strainer 10. The hollow body 12 is closed off by a cover 14 which connects to the body 12 through standard latch bolts 56. A backwash arm 22 connects through shaft 26 and reducer 46 to motor 24.

The arrangement of the backwash arm 22 is generally conventional and while certain thrust collars, lubrication fittings, bearing housings and other seals are shown, they will not be described in detail since they are standard and do not form a part of the subject invention, FIGS. 1 and 2.

An upper support ring 28 connects by pins to a downwardly depending flange 29 of the cover 14 and a lower support ring 30 connects at the terminus of the shaft 26, FIG. 1. Positioned within and extending between the support rings 28 and 30 is strainer element 20.

Figure 3:
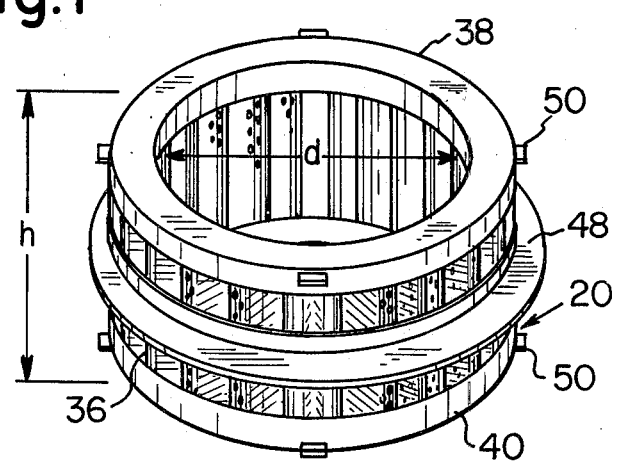
FIG. 3 is an isometric view of the strainer element.

The strainer element 20 includes a radially convoluted screen 36 which extends 360° to form a cylindrical arrangement, FIG. 3. The screen 36 itself has overlapped ends which are welded to form a continuous vertical seam (not shown). The opposing ends of the convoluted screen 36 are encapsulated by upper end cap 38 and a lower end cap 40, respectively, which are welded to the convolutes. The end caps 38 and 40 are annular and channel-shaped and are formed by appropriately bending sheet metal into the desired configuration. Extending from each of the end caps 38 and 40 are four tabs 50. Tabs 50 are spaced at 90° intervals and extend outwardly at locations adjacent the upper and lower surfaces of end caps 38 and 40, respectively. Intermittent the end caps and surrounding the convoluted screen 36 is a ring-shaped reinforcement angle 48. Depending on the size of the strainer 20, additional reinforcement angles may be employed. In some applications a simple band or no reinforcement at all is sufficient.

The upper and lower support rings 28 and 30 which hold the strainer 20 are generally identical in function and only upper support ring 28 is shown in detail, FIGS. 4 and 5. Upper support ring 28 is annular in shape and includes a depressed annular groove 32. Lower support ring 30 includes a depressed annular groove 34, FIG. 1. Groove 32 is dimensioned so as to matingly engage the end cap 38 of the strainer 20. Upper support ring 30 includes slot 52 which accommodate tabs 50 of end cap 38. The interlock formed between tabs 50 and slots 52 prevent the strainer element 20 from rotating should debris collect against the backwash arm 22 and disrupt its normal rotation.

The general flow of fluid is illustrated by the directional arrows in FIG. 1. The fluid to be filtered enters inlet 16 and flows up into strainer element 20 which is positioned above inlet 16. The fluid passes through the strainer element 20 and down and out through outlet 18 which is coaxial with inlet 16 and below the strainer element 20. Backwashing occurs by the continuous rotation of backwash arm 22 which continuously and successively isolates portions of the convoluted screen 36 and through pressure differential causes reverse flow of the fluid so as to clean the screen 36 and discharge the debris.

The ease of assembly can best be seen in FIG. 2 where the cover 14 has been removed and the strainer element 20 disassembled from the strainer 10. It can be seen that the strainer element 20 is maintained in assembled relationship to the remainder of the strainer 10 by a simple snap ring 44 which fits adjacent a bearing housing collar 42 and snaps in place on the terminus end of shaft 26 of the backwash arm 22. Should the strainer 10 suddenly become blinded by a surge of solids, the cover 14 is merely raised to expose the strainer element 20 held thereto. The strainer element 20 can then be hosed with water, steam, compressed air or other means and the debris merely falls to the inside and down through the backwash outlet. Should it be necessary to replace the strainer element 20, snap ring 44 is merely removed from shaft 26 and a new strainer 20 is readily positioned in place within the upper and lower seal rings 28 and 30, respectively.

By using a convoluted strainer, we have provided a more effective use of screening area. Referring to FIG. 6, where a portion of the pitch line P is shown, we have found an optimum convoluted surface to be 2.19 times the pitch of the convolute. In addition, by providing a 360° convoluted surface, we can further provide more surface area so as to shorten the height of the strainer element 20. We have found that height of the strainer element (h) is actually less than its diameter (d), FIG. 3. For example, on a 12 inch inlet, the strainer element has an inside diameter of $15\frac{5}{8}$ inches, an outside diameter of $18\frac{3}{8}$ inches and a height of only $12\frac{1}{8}$ inches.

We have thus been able to turn the strainer element 20 into a self-supporting structural member which is capable of withstanding the loads imposed on it by the flow of fluid and debris through the element. This has been accomplished by shortening the strainer element, encapsulating the ends to prevent torsional rotation under flow conditions and using appropriate reinforcement around the strainer element and intermittent the encapsulated ends where necessary.

We claim:

1. A strainer for removing debris from a fluid passing thereby comprising:
   A. a hollow body having an inlet and outlet thereto;
   B. a cover attached to and closing off said hollow body;
   C. a backwash arm assembly extending through and connected to said cover and terminating within said hollow body;
   D. an upper support ring connected to the cover and having an annular downwardly facing channel;
   E. a lower support ring detachably connected to the terminus of the backwash arm assembly and having an annular upwardly facing channel;
   F. a radially convoluted screen cylinder having end caps at opposite ends thereof connected to and encapsulating said screen, said end caps sealably retained in said support rings so that said cylinder is removable with said cover and is positioned above said inlet and outlet, said cylinder being capable of withstanding loads imposed on it by said fluid and debris and being positioned above said inlet and outlet so that fluid enters the strainer, flows upward into the cylinder, outward through the cylinder and downward to and out of said outlet.

2. The strainer of claim 1 wherein at least one of said end caps includes spaced and outwardly extending tabs adapted to be accommodated by corresponding slots in said support rings to prevent rotation of said screen cylinder.

3. The strainer of claim 1 wherein the diameter of said convoluted screen cylinder is greater than its height.

4. The strainer of claim 1 further including reinforcing means positioned about said screen cylinder intermittent of said end caps.

5. The strainer of claim 4 wherein said reinforcing means includes one of a circular band or ring-shaped reinforcement angle.

6. The strainer of claim 1 wherein the ratio of the convolutes of the screen cylinder to pitch line is on the order of 2.19 to 1.

* * * * *